United States Patent
Tensing

(10) Patent No.: US 8,826,596 B2
(45) Date of Patent: *Sep. 9, 2014

(54) DOOR EDGE PROTECTION DEVICE

(71) Applicant: Ford Global Technologies, LLC, Dearborn, MI (US)

(72) Inventor: Matthias Tensing, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,417

(22) Filed: Jul. 8, 2013

(65) Prior Publication Data
US 2013/0300150 A1      Nov. 14, 2013

Related U.S. Application Data

(63) Continuation of application No. 13/100,418, filed on May 4, 2011, now Pat. No. 8,516,748.

(30) Foreign Application Priority Data

May 18, 2010   (DE) .......................... 10 2010 029 065 U

(51) Int. Cl.
*E05F 7/00* (2006.01)
*B60J 5/00* (2006.01)
*B60R 13/04* (2006.01)

(52) U.S. Cl.
CPC .................................. B60R 13/043 (2013.01)
USPC .................... 49/462; 49/460; 70/417; 70/418

(58) Field of Classification Search
USPC .......... 49/460, 462; 292/1, DIG. 38, DIG. 65, 292/DIG. 70; 296/152; 70/416, 417, 418
See application file for complete search history.

(56) References Cited

U.S. PATENT DOCUMENTS

| | | | | | |
|---|---|---|---|---|---|
| 2,587,746 | A | * | 3/1952 | May | 74/520 |
| 2,678,232 | A | * | 5/1954 | Barry | 49/462 |
| 3,207,108 | A | * | 9/1965 | Comerio | 112/221 |
| 3,243,222 | A | * | 3/1966 | Loughary et al. | 49/460 |
| 3,280,510 | A | * | 10/1966 | Vaux | 49/401 |
| 3,406,453 | A | * | 10/1968 | Halada | 33/23.03 |
| 3,473,264 | A | * | 10/1969 | Holka | 49/462 |
| 3,576,338 | A |   | 4/1971 | Horton | |

(Continued)

FOREIGN PATENT DOCUMENTS

| DE | 9405958 U1 | 9/1994 |
|---|---|---|
| DE | 19934404 A1 | 11/2000 |

(Continued)

*Primary Examiner* — Katherine Mitchell
*Assistant Examiner* — Shiref Mekhaeil
(74) *Attorney, Agent, or Firm* — Raymond Coppiellie; Price Heneveld LLP

(57) ABSTRACT

A door edge protection device for a motor vehicle door, with a door edge protection profile (5) which is guided movably with respect to the door at at least two points lying one behind the other in the longitudinal direction of the door, the door edge protection profile (5) being driven via an eccentric lever (7) mounted rotatably in the door and the door edge protection profile (5) having a holding rod (6) which is guided by a linear guide (10) which is fixed in the door, the holding rod (6) being bent in the region of the linear guide (8, 9; 11).

11 Claims, 2 Drawing Sheets

(56) References Cited

U.S. PATENT DOCUMENTS

| | | | | |
|---|---|---|---|---|
| 3,879,895 | A * | 4/1975 | Hinderks | 49/462 |
| 4,165,122 | A | 8/1979 | Bertone | |
| 4,221,411 | A * | 9/1980 | Kawada | 293/118 |
| 4,640,542 | A | 2/1987 | Watjer et al. | |
| 4,839,991 | A * | 6/1989 | Rathgeb | 49/462 |
| 5,111,620 | A | 5/1992 | Lau et al. | |
| 5,405,185 | A | 4/1995 | Cheron et al. | |
| 5,771,723 | A | 6/1998 | Itoh | |
| 5,910,777 | A | 6/1999 | Natali et al. | |
| 5,971,463 | A | 10/1999 | Nowak et al. | |
| 6,257,666 | B1 * | 7/2001 | Struppler | 297/302.4 |
| 6,431,636 | B1 * | 8/2002 | Schutt | 296/107.18 |
| 6,533,346 | B2 * | 3/2003 | Yu | 296/152 |
| 6,550,839 | B2 | 4/2003 | Rogers, Jr. et al. | |
| 6,560,930 | B2 | 5/2003 | de Gaillard | |
| 6,755,268 | B1 | 6/2004 | Polz et al. | |
| 6,776,443 | B2 | 8/2004 | Shimura et al. | |
| 6,938,374 | B2 | 9/2005 | Yamamoto et al. | |
| 7,000,720 | B2 | 2/2006 | Polz et al. | |
| 7,144,066 | B2 | 12/2006 | Omori et al. | |
| 7,159,927 | B2 | 1/2007 | Ihashi et al. | |
| 7,360,339 | B1 * | 4/2008 | Jooste | 49/462 |
| 7,530,612 | B2 | 5/2009 | Regnell et al. | |
| 8,108,971 | B2 * | 2/2012 | Florek | 16/357 |
| 8,122,644 | B2 | 2/2012 | Jarolim | |
| 8,303,021 | B2 | 11/2012 | Lichter et al. | |
| 8,353,557 | B2 | 1/2013 | Rooijakkers | |
| 8,380,257 | B2 * | 2/2013 | Jeong et al. | 455/575.1 |
| 2004/0140685 | A1 * | 7/2004 | Bieck et al. | 296/37.12 |
| 2009/0140534 | A1 * | 6/2009 | Lichter et al. | 293/118 |

FOREIGN PATENT DOCUMENTS

| | | |
|---|---|---|
| DE | 10215903 A1 | 10/2003 |
| DE | 102004031798 A1 | 1/2006 |
| EP | 2065260 A2 | 11/2008 |
| WO | 2005021305 A1 | 3/2005 |

* cited by examiner

DOOR EDGE PROTECTION DEVICE

CROSS-REFERENCE TO RELATED APPLICATION

This application is a continuation of U.S. patent application Ser. No. 13/100,418, filed on May 4, 2011, now U.S. Pat. No. 8,516,748, entitled "DOOR EDGE PROTECTION DEVICE." The aforementioned related application is hereby incorporated by reference.

FIELD OF THE INVENTION

The present invention relates to a door edge protection device for motor vehicle doors.

BACKGROUND OF THE INVENTION

Edge protection devices of this type have edge protection bodies which are arranged inside the door body in the vicinity of the opening door edge and, when the door is opened, pivot around the door edge and surround this, so that, when the door is opened further, the door edge is protected from bumps against adjacent vehicles or other obstacles, such as trees, walls, etc., so as not to be damaged.

Edge protection body devices of this type are disclosed, for example, in U.S. Pat. No. 4,221,411; DE 19934404; DE 10215903; DE 102004031798 and WO 2005/021305. These known edge protection devices have the disadvantage that the edge protection body, when it is moved out of the position of rest, with the door closed, when the door is opened executes predominantly a rotation of approximately 180° about an axis parallel to the door edge or parallel to the vehicle longitudinal axis. However, since the door edge of a motor vehicle door is usually not designed to be straight, but curved, in the known devices the edge protection bodies generally cannot be designed with an elongate contour adapted to the edge contour, but, instead, can typically protect only a narrowly limited region of the edge. Furthermore, these are sometimes complicated structures taking up a large amount of space.

DE 9405958 U1 discloses an edge protection device in which the edge protection profile is mounted twofold, the mounting which faces away from the door edge being a linear guide which at the same time serves for driving the edge protection profile, while the mounting which faces the door edge takes place by means of an intermediate lever which is mounted on the door and which, during the forward/backward movement of the drive, causes a pivoting movement of the edge protection profile about the door edge. The disadvantage of this is that the pivoting movement generally does not make it possible to move the edge protection profile around the entire door edge, since, because of the linear drive, the intermediate lever can execute only a pivoting movement of less than 180°. However, it is generally necessary for the door edge to be surrounded in this way by the door edge protection profile if the door edge is to be effectively protected, particularly in the case of sharp corners and edges against which the door is opened.

EP 2 065 260 A2 has disclosed a door edge protection device for motor vehicle doors with a door edge protection profile which is guided movably with respect to the door at at least two locations which lie behind one another in the longitudinal direction of the door, the door edge protection profile being driven via an eccentric lever which is mounted rotatably in the door. It is further known from the embodiment of FIG. 4 that the door edge protection profile is guided by a linear guide which is fixed on the door.

It is desirable to provide a door edge protection device which affords improved protection despite the tight space conditions in the door.

SUMMARY OF THE INVENTION

According to one aspect of the present invention, a door edge protection device for a motor vehicle door is provided. The protection device includes a door edge protection profile guided movably with respect to the door at at least two points lying one behind the other in a longitudinal direction of the door. The door edge protection profile being driven via an eccentric lever mounted rotatably in the door and having a holding rod guided by a linear guide fixed in the door. The holding rod is bent in a region of the linear guide.

According to another aspect of the present invention, a vehicle door edge protection device is provided that includes a door edge protection profile guided movably with respect to a door at at least two points lying one behind the other in a longitudinal direction of the door. The vehicle door edge protection device further includes an eccentric lever driving the door edge protection profile and mounted rotatably in the door and comprising a holding rod guided by a linear guide fixed in the door and bent in a region of the linear guide.

According to a further aspect of the present invention, a vehicle door edge protection device is provided that includes a door edge protection profile guided movably with respect to a vehicle door. The vehicle door edge protection device further includes a linear guide fixed in the door and an eccentric lever mounted rotatably in the door. The vehicle door edge protection further includes a holding rod for driving the door edge protection profile. The eccentric lever is behind the linear guide in a longitudinal direction of the door.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1A:
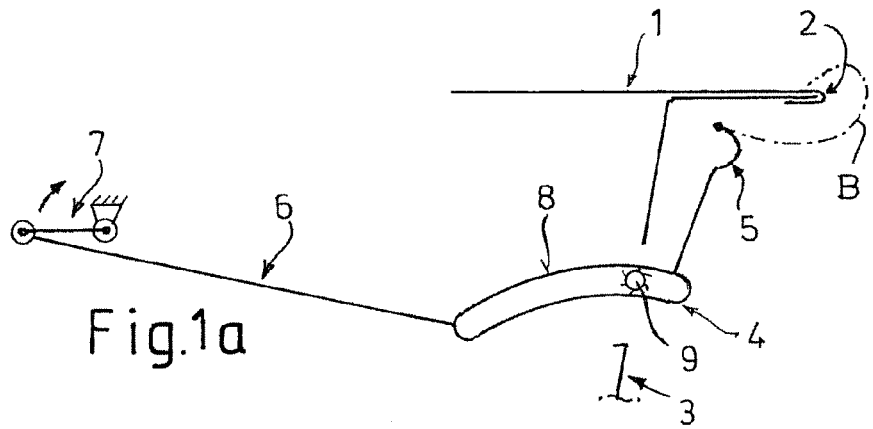
FIG. 1 shows a schematic diagram of a door edge protection device having an eccentric lever and a slotted guide in four different movement phases a), b), c) and d), according to one embodiment.
Figure 1B:
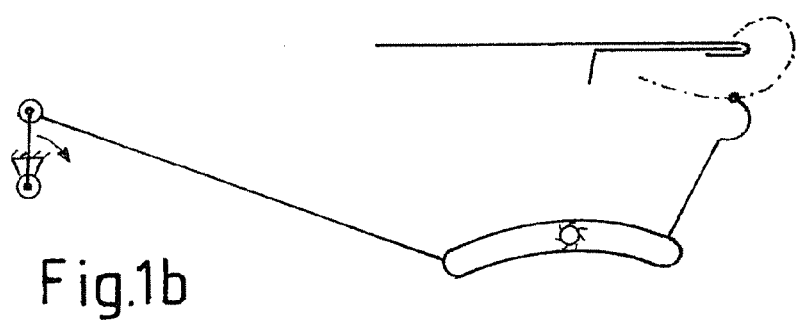
Figure 1C:
Figure 1D:
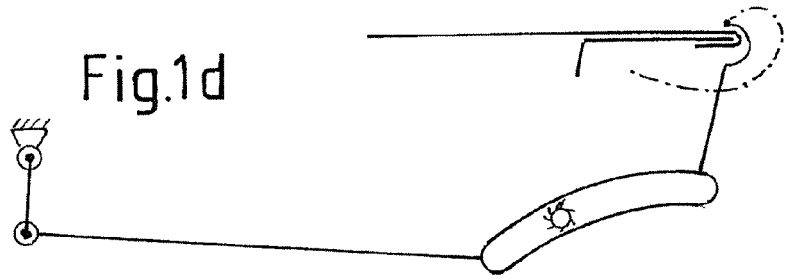

FIG. 1 indicates diagrammatically the door outer panel 1 with the door edge 2 to be protected and with the end face 3 of the door. The end face 3 has an orifice 4 through which the door edge protection profile 5 projects. When the door is closed (FIG. 1a), the door edge protection profile 5 is concealed by the door edge 2, as seen from outside. The door edge protection profile 5 has a holding rod 6 connected to the eccentric lever 7. The eccentric lever 7 is mounted rotatably in the door via an eccentric shaft.

The diagrammatic embodiment shown in FIG. 1 in four different movement phases a), b), c) and d) has a slotted assembly 8 as front guidance and the eccentric lever 7 as rear guidance. The slotted guide 8 is formed by a bent part of the holding rod 6. The curvature of the slotted guide 8 is such that the circular movement of the eccentric lever 7 and the necessary translatory movement for reaching around the door edge 2 are carried out.

The slotted guide 8 runs on a linear guide which is formed by a stationary pin 9. The slotted guide 8 is therefore bent in the region of the linear guide. In the slotted guide 8, the edge protection profile 5 is guided with the pin 9. The drive takes place via the eccentric lever 7 which is mounted on the eccentric shaft.

In FIG. 1, the edge protection profile 5 is first in the position of rest a). As a result of the rotation of the eccentric lever 7, the edge protection profile 5 is moved into the protection position d) via the positions b) and c). The bent slotted guide allows a highly space-saving movement of the edge protection profile 5 out of the position of rest into the protection position, and the drive via the eccentric lever 7 makes it possible for the door edge 2 to be surrounded by the edge protection profile 5, in that the backward movement in the slotted assembly between positions c) and d) is made possible. The movement curve B of the door edge protection profile 5 is shown by a dash dotted line in FIGS. 1a), b), c) and d). The edge protection profile describes a slightly elliptical path, a slight variation of the orientation in space taking place.

Figure 2A:
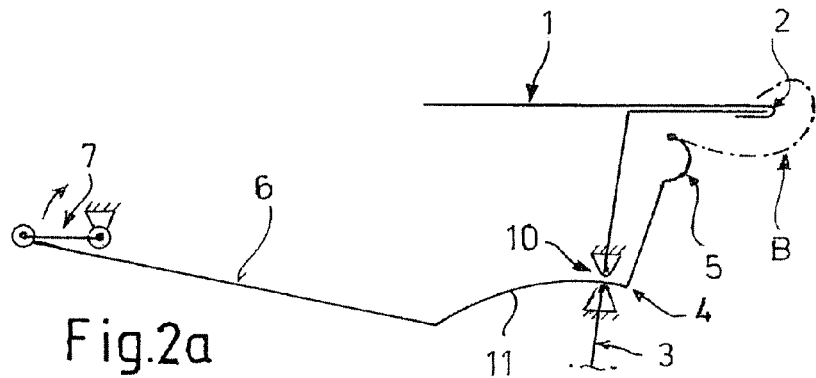
FIG. 2 shows a schematic diagram of a door edge protection device having an eccentric lever and with a linear guide in four different movement phases a), b), c) and d), according to another embodiment.
Figure 2B:
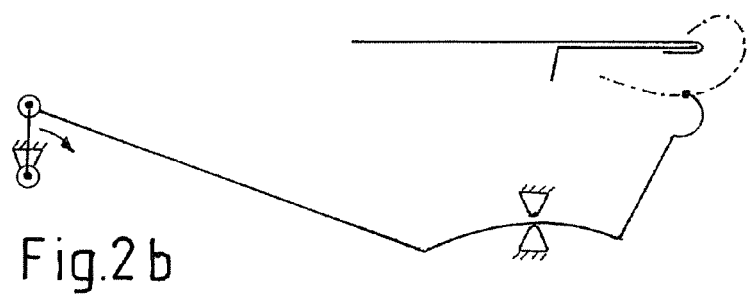
Figure 2C:
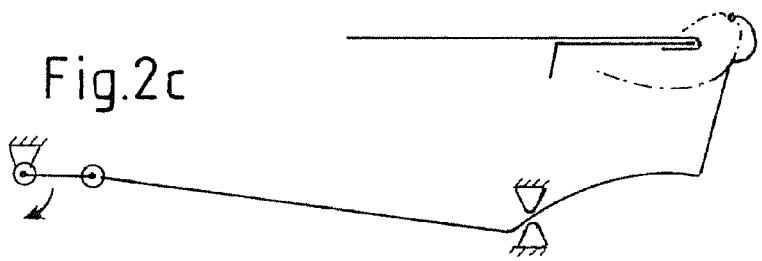
Figure 2D:
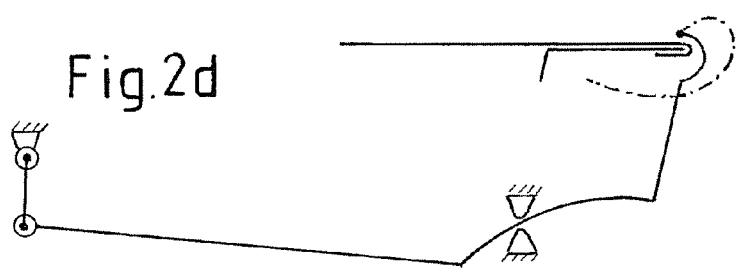

FIG. 2 shows an alternative embodiment, a simple linear guide 10 being arranged as front guide at the orifice 4 on the end face 3 of the door box and the eccentric lever 7 being arranged as rear guide on the inside in the door box. The holding rod 6 forms a bent region 11 in the region of the linear guide 10. Its curvature is analogous to the curvature of the slotted guide 8 from the embodiment of FIG. 1. The movement curve B of the door edge protection profile 5 is shown by a dash dotted line in FIGS. 2a), b), c) and d) and, despite the different embodiment of the protection device, corresponds to the movement curve of the embodiment from FIG. 1.

As a result of the fact that the holding rod is bent in the region of the linear guide, it is possible to achieve a substantially improved movement curve of the door edge protection profile. As a result of the bent holding rod, it is possible to adapt the movement curve to a very small space in such a way that the door edge protection profile is adjusted to the door edge itself. It is a further advantage that, if force is introduced by an obstacle, for example a wall, the profile does not move away from the door edge, but rather is pulled onto the door edge. The protective effect is therefore improved considerably.

The combination with the eccentric lever drive makes it possible for the door edge protection profile in this case to move along the predetermined narrow movement curve or path in an essentially fixed spatial direction and in translation and then also to execute the necessary forward and backward movements in order to surround the outer door edge in a protective manner. The predominantly translational movement in an essentially fixed spatial direction arises from the twofold guidance of the door edge protection in the door at the two points lying one behind the other in the longitudinal direction of the door, namely by the eccentric lever on the one hand and the linear guide on the other hand.

In the vehicle door embodiment, the longitudinal direction of the door means essentially the orientation parallel to the outside of the door and transverse to the door edge to be protected. Where a vehicle side door is concerned, the longitudinal direction corresponds approximately to the direction of travel, if the door is mounted on a column by means of hinges and the door edge to be protected lies opposite the hinges and runs approximately vertically. In a vehicle tailgate embodiment, the longitudinal direction corresponds to the vertical (in the closed state) if the tailgate is mounted on the roof frame by means of hinges and the door edge to be protected is the lower edge of the tailgate. Where laterally fastened tailgates are concerned, the longitudinal direction would be the horizontal transversely with respect to the direction of travel if the vertical door edge of the tailgate is to be protected.

The forward and backward movement is generated in that the eccentric lever is rotated parallel to the longitudinal direction of the door beyond one end position. The rotary mounting of the eccentric lever in the door consequently results automatically, on the other side of the eccentric lever, in the forward and backward movement if this side drives the door edge protection profile.

The door edge protection profile can consequently be adapted to the contour of the door edge over a large portion of the door edge and nevertheless can both be accommodated in a space-saving way on or in the door and be moved in a space-saving way into the protection position. The door edge protection device protects the door edge over a far larger region than previous protection profiles and yet requires only a small installation space.

During the outward movement itself, the space required for the movement is likewise limited to a minimum, since the predominantly translational movement arising from the twofold guidance of the door edge protection profile makes it possible to have a short movement travel required to move the door edge protection profile from the position of rest into the protection position.

In one embodiment, the holding rod has a slotted guide in the bent region. The fixed linear guide for the slotted guide can then be formed by, for example, a cam, a pin, etc.

According to another embodiment, in the simplest case, the holding rod can comprise merely a bent region which is guided. The linear guide can be arranged firstly between the door edge protection profile and eccentric lever. The eccentric lever grips as it were at the rear on the holding rod.

According to a further embodiment, the eccentric lever can be arranged between the door edge protection profile and the linear guide. The linear guide then lies in the rear region of the holding rod and the drive can lie further to the front in the direction of the door edge.

Normally, the eccentric lever executes a rotational movement of at least 180° and at most 360°. The 180° are necessary in order to obtain the forward and backward movement which is required for surrounding the door edge in the protection position. A larger angle of rotation of the eccentric lever than 360° is expedient if the door edge protection profile has two guides which, despite the full rotation of the eccentric lever, bring the door edge protection profile from the position of rest into the protection position. The angle of rotation is advantageously between 0° to 250° and 0° to 290°, particularly when the eccentric lever also assumes the front guidance of the door edge protection profile. In this context, "front guidance" means the guide which lies nearer to the door edge to be protected than the second guide lying behind it in the longitudinal direction, here called "rear guidance." The door edge protection profile can consequently be moved out of the position of rest on or in the door into the protection position around the door edge.

For the drive of the eccentric lever, there are many possible versions, some advantageous ones of which are described below. These examples are not complete, on the contrary all drives are suitable which apply a torque to the eccentric lever and consequently cause a rotation of the latter. For example, a cable pull which winds itself up and interacts with the axis of rotation of the eccentric lever can be used as the drive.

The eccentric lever advantageously has an eccentric shaft on which the drive acts. The drive can then be applied to the eccentric lever from a position which may also be mounted outside the movement mechanism.

The drive of the eccentric lever may take place via a rack which acts on a gearwheel connected to the eccentric lever. In this case, the gearwheel may also be connected to the eccentric lever via an eccentric shaft. The drive may also take place directly to this gearwheel by means of a suitable actuator, motor, etc.

In one possible embodiment, the eccentric lever or the eccentric shaft is driven via a push rod and/or a Bowden cable. However, the eccentric lever may also be driven, both on the eccentric shaft and at any other point, by an electric motor. The electric motor may in this case also bring about the drive to the eccentric lever via the above mentioned drive variants, for example the gearwheel.

The drives described here constitute particularly advantageous embodiments. It will be appreciated that the drive of the door edge protection profile may take place by means of all other suitable actuators, that is to say pneumatic, electric, hydraulic or mechanical actuators. A mechanical actuator may, for example, utilize the door opening movement as drive energy, as is described further below as an exemplary drive unit. Furthermore, the actuators may act in any suitable way on the eccentric lever directly or indirectly, for example via Bowden cables, push rods, an eccentric shaft, etc.

In a further embodiment, the door edge protection profile is driven counter to a spring which undergoes tension. Consequently, only one drive in one direction is necessary, for example in order to move the door edge protection profile into the protection position. In this case, the door edge protection profile is moved either during the closing of the door or the opening of the door by means of the resultant spring force and is moved into the position of rest or the protection position, respectively. The spring may act on the eccentric shaft in that the rotation of the eccentric shaft is stored as torsion energy in the spring. This makes it possible to have a highly compact arrangement of the spring.

In one embodiment, the door edge protection profile, during its movement, is thus guided by a bent slotted assembly as part of the holding rod. Slotted guides likewise allow a predominantly translational displacement of the door edge protection profile out of the position of rest into the protection position. Owing to the drive by means of the eccentric lever, the door edge protection profile can also execute the surrounding movement, predetermined by the slotted assembly, around the door edge.

In another alternative embodiment, the door edge protection profile, during its movement, is guided by a linear guide fixed in the door and the holding rod is itself bent in this region. Consequently, at one end, the door edge protection profile can be guided uniformly in the door, while, at the other end, the door edge protection profile experiences the required pivoting movement by means of the eccentric lever.

In one embodiment, the door edge protection profile may be guided inside the door on an eccentric lever by means of a hinge. In this embodiment, a change in the spatial direction of the door edge protection profile in a horizontal plane of up to 20° about a linear guide fixed in the door can be taken into account. A particularly beneficial configuration is achieved in that the first guide by means of the eccentric lever inside the door is arranged further away from the protection profile, and the second guide by means of a linear guide is arranged in the vicinity of the end-face issue from the door case.

The linear guide or, respectively, the pin or the bolt is arranged in the longitudinal direction of the door level with the door front side, according to one embodiment. In this embodiment, the transverse movement of the door edge protection profile is minimal, and therefore the orifice of issue from the door case can have a minimal configuration and does not need to be closed in a complicated manner, for example by bellows.

In an advantageous embodiment, the door edge protection profile comprises an elastic holding rod. The door edge protection profile can then execute an elastic reversible movement with respect to the guides, without being damaged. Particularly when the outward movement of the door edge protection profile is blocked by an obstacle, damage to the door edge profile and/or to the mechanism of the protection device is prevented.

A similar action is achieved when the door edge protection profile is fastened releasably in the region of the holding rod. Then, in the event of an overload which acts on the door edge protection profile during the outward movement, for example due to a blockage, the door edge protection profile can be released from the mechanism of the protection device. Advantageously, this releasable connection is configured such that, after release, the door edge protection profile can be connected to the mechanism again without further aids. This may be implemented, for example, in that the holding rod is of two-part design, and that part of the holding rod which is connected to the mechanism clamps with a certain prestress that part of the holding rod which is connected to the door edge protection profile. This clamping causes the two parts to be released from one another in the event of overload. Thereafter, the two parts are clamped one in the other again with little effort and without a tool.

The protection device preferably comprises a drive unit which is controlled by the degree of opening of the door. In this case, the control and/or the drive may take place mechanically, electrically/electronically, pneumatically or by means of other suitable controls/actuators. The task of the drive unit is in this case to provide a drive even at the earliest possible point in time during the opening of the door, that is to say in the case of the smallest possible opening angle of the door, in order to move the door edge protection profile into the protection position as quickly as possible. This is expedient because the door edge is still to be protected even in the case of small door opening angles, for example when parking gaps are narrow or when the vehicle is parked very closely to a wall etc. and a vehicle occupant opens the door carelessly.

The protection device advantageously comprises a drive unit for driving the eccentric lever, said drive unit being controlled by the degree of opening of the door. A relationship is consequently made directly between the door opening angle and the movement of the door edge protection profile out of the position of rest into the protection position.

Advantageously, the drive unit provides the drive between a first door opening angle and a second door opening angle, in which case the first door opening angle should amount to between 0° and 15°, in particular 4° and 6°, and the second door opening angle should amount to between 12° and 30°, in particular 14° and 16°. The door edge protection profile commences its pivoting movement when the first door opening angle is reached and ends the pivoting movement when the second door opening angle is reached, so that the door edge is protected over a broad angular range during further opening.

The linear guide can be configured as a sliding guide and/or as a rolling guide. In the case of the sliding guide, the linear guides are designed with low friction surface materials in the friction region. In the case of the rolling guides, one or more of the stationary linear guides of the holding rod can be configured as running rollers. In the case of the cam which is stationary in the door, this cam would then be surrounded, for example, by a rotatable running roller in the contact region with the holding rod.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A vehicle door edge protection device comprising:
a door edge protection profile movably guided with respect to a vehicle door;
a linear guide fixed in the door;
a rod comprising a curved portion disposed in the linear guide; and
a lever that executes rotational movement of at least 180° to drive the rod to move the door edge protection profile along a curved path between a retracted position and an extended position on an edge of the door, wherein the curved portion of the rod in combination with the linear guide dictates the curved path of the movement of the door edge protection profile between the retracted and extended positions.

2. The protection device as claimed in claim 1, wherein the lever executes rotational movement greater than 250° to drive the rod to move the door edge protection profile between the retracted position and the extended position.

3. The protection device as claimed in claim 2, wherein the lever executes rotational movement between 0° to 290° to drive the rod to move the door edge protection profile between the retracted position and the extended position.

4. The protection device as claimed in claim 1, wherein the lever executes rotational movement of at most 290° to move the door edge protection profile between the retracted position and the extended position.

5. The protection device as claimed in claim 1, wherein the door edge protection profile is guided movably with respect to the door at least two points lying one behind another in a longitudinal direction of the door.

6. The protection device as claimed in claim 5, wherein the door edge protection profile is guided movably with respect to the door at one point provided by the lever lying behind another point provided by the linear guide in the longitudinal direction of the door.

7. The protection device as claimed in claim 1, wherein the lever executes rotational movement of approximately 270° to drive the rod to move the door edge protection profile between the retracted position and the extended position.

8. A vehicle door edge protection device comprising:
a door edge protection profile movably guided with respect to a vehicle door;
a linear guide fixed in the door; and
a lever mounted rotatably in the door and coupled to a holding rod having a curved portion disposed in the linear guide for driving the door edge protection profile as the lever executes a rotational movement between 0 to 290° to move the door edge protection profile along a curved path between a retracted position and an extended position on an edge of the door, wherein the curved portion of the rod in combination with the linear guide dictates the curved path of the movement of the door edge protection profile between the retracted and extended positions.

9. The protection device as claimed in claim 8, wherein the lever is behind the linear guide in a longitudinal direction of the door.

10. The protection device as claimed in claim 8, wherein the door edge protection profile is guided movably with respect to the door at one point provided by the lever lying behind another point provided by the linear guide in the longitudinal direction of the door.

11. The protection device as claimed in claim 8, wherein the lever executes rotational movement of approximately 270° to drive the rod to move the door edge protection profile between the retracted position and the extended position.

* * * * *